| United States Patent [19] | [11] Patent Number: 4,717,488 |
| Seheult et al. | [45] Date of Patent: Jan. 5, 1988 |

[54] SPACER FLUID

[75] Inventors: James M. Seheult; Ernest L. Grebe, both of Spring, Tex.

[73] Assignee: Merck Co., Inc., Rahway, N.J.

[21] Appl. No.: 856,073

[22] Filed: Apr. 23, 1986

[51] Int. Cl.$^4$ .................. E21B 43/00; C08B 37/00
[52] U.S. Cl. ..................... 252/8.551; 252/315.3; 536/114
[58] Field of Search ............... 252/8.551, 315.3, 363.5; 536/114

[56] References Cited

U.S. PATENT DOCUMENTS

| 4,141,843 | 2/1979 | Watson | 252/8.551 |
| 4,304,300 | 12/1981 | Watson | 252/8.551 |
| 4,312,675 | 1/1982 | Pickens et al. | 106/174 X |
| 4,330,414 | 5/1982 | Hoover | 252/8.551 X |
| 4,342,866 | 8/1982 | Kang et al. | 252/8.51 X |
| 4,350,601 | 9/1982 | Mosier et al. | 252/8.551 |
| 4,352,861 | 4/1982 | Braun et al. | 252/363.5 X |
| 4,566,977 | 1/1986 | Hatfield | 252/8.551 X |

Primary Examiner—Herbert B. Guynn
Attorney, Agent, or Firm—Gabriel Lopez; Hensa J. Pfeiffer

[57] ABSTRACT

A spacer fluid for use in oil well drilling applications is disclosed. The fluid is prepared from a slurry comprising 25–60% heteropolysaccharide S-130, 0.5–6% organophilic clay, 30–70% solvent, up to 10% surfactant, and up to 6% methanol or isopropanol.

6 Claims, No Drawings

SPACER FLUID

BACKGROUND OF THE DISCLOSURE

In the drilling and completion of oil wells, various types of fluids are used. The fluid of choice is a function of the subterrean formation, underground temperature, to what stage the drilling operation has proceeded, etc. Thus, an operator may use various drilling, workover, and completion fluids such as drilling muds, acidicing fluids, hydraulic fracturing fluids, and eventually cement prior to completing a hole. It is highly desirable that these fluids not intermix as one is replacing the other in the borehole and for this purpose spacer fluids are used. In formulating such spacer fluids for particular applications, the operator must prepare the fluids as so to be compatible with the two fluids being separated. Thus, density must be adjusted, cross-linking must be avoided, etc. Generally, such fluids comprise water, clay, and a polymer such as hydroxyethyl cellulose, polyacrylamides, guar gum derivatives, or xanthan gum.

SUMMARY OF THE INVENTION

It has now been found that a slurry of Hexeropolysaccharide S-130, organophilic clay, solvent, surfactant, and loweralkanol is particularly useful in preparing spacer fluid formulations, especially cement spacer fluids.

DETAILED DESCRIPTION

The slurries of this invention comprise:

|  | Wt. % |
| --- | --- |
| S-130 | 25–60 |
| Organophilic clay | 0.5–6 |
| Hydrocarbon solvent | 30–70 |
| Surfactant | 0–10 |
| Lower alkanol | 0–6 |

By S-130 or Hexeropolysaccharide S-130 is meant the heteropolysaccharide described in Kang et al., U.S. Pat. No. 4,342,866.

By organophilic clay is meant any of the several thickening agents used in the drilling industry. These include bentonite, hectorite, amine-treated montmorillonite, and attapulgite clay.

By hydrocarbon solvent is meant mineral oil 8petroleum or liquid petrolatum), diesel oil, kerosene, 5–12 carbon branched- or straight chain alcohol, vegetable oil (such as castor, cottonseed, or rapeseed oil and the like), ester-alcohols, and the like. A preferred solvent is mineral oil.

By surfactant is meant ethoxylated nonylphenols, the fatty acid esters of vegetable or animal oils, ethoxylated linear alcohols, and ethylene glycol monobutyl ether.

By lower alkanol is meant 1–3 carbon chain branched- or straight-chain alcohols especially methanol and isopropanol (IPA).

The slurries are prepared by mixing the organophilic clay, the surfactant, alkanol and S-130 into the hydrocarbon solvent until a dispersed and stable mixture is formed.

A typical slurry at this invention comprises:

|  | % (wt.) |
| --- | --- |
| mineral oil | 67.5 |
| surfactant | 3 |
| IPA | 2.5 |
| organophilic | 3.5 |
| BIOZAN$^R$, S-130 | 23.5 |

The spacer fluid can then be prepared at once or at a later date by mixing the slurry into the water being used and shearing and mixing until satisfactory rheological properties are obtained as determined by those skilled in the art of drilling and spacer fluids. The water may be fresh water, seawater, or water containing salts such as NaCl, KCl, $NH_4Cl$, KBr, LiCl or LiBr. $CaCl_2$, $CaBr_2$ or $ZnBr_2$ may be used in the water at levels much less than saturation.

The spacer fluid generally will comprise 0.25 to 2.5 lb of S-130/bbl (42 gallons) of fluid (0.113–1.13 kg/158.98 l), the balance being water, generally with additional ingredients as required for the particular application. Although direct mixing of dry S-130 with water can yield a suitable spacer fluid, preparation from the slurry of this invention is preferred.

In any particular situation, the final make-up of the fluid will be determined by the operator, depending on the intended use of the spacer fluid. Various criteria will determine the actual composition: for example, the chemistry and density of the fluids being separated; desired pumping rate; the need to use dispersants, friction reducers, wetting agents, retarders or fluid loss additives; etc. These criteria are well known to those skilled in the art.

Advantageously, the slurries of this invention are stable, i.e. there is little or no separation of the components thereof for up to two years after preparation and they are easily mixed with additional ingredients to prepare spacer fluids. Likewise, the spacer fluids of this invention are very stable to thermal degration up to temperatures of 149° C. (300° F.). This is particularly important in deep wells, where such high temperatures are often encountered.

A particularly preferred spacer fluid of this invention is the cement spacer fluid, i.e. a spacer fluid used between the existing fluid in a borehole (usually a drilling mud) and a fluid cement or completion fluid. As the drilling mud is often incompatible with the other fluids and it is highly desirable that no mixing or interaction between the incompatible fluids take place, spacer fluids are often used to limit or prevent interactions.

In the past, spacer fluids containing polymeric viscosifiers have been limited or unsuccessful in subterranean wells, where temperatures of 149° C. or higher are encountered. The use of xanthan gum, hydroxyethyl cellulose, and polyacrylamide polymers have been limited due to temperature thinning of the viscosity provided by these polymers. The use of S-130 is a significant improvement as S-130 does not lose significant viscosity at 149° C. The S-130 slurry of the invention is a most efficient method of preparing these stable spacer fluids.

The invention is further defined by reference to the following example, which is intended to be illustrative and not limiting.

EXAMPLE 1

S-130 Slurry Stability

Slurries of S-130 (BIOZAN®-Kelco Division, Merck & Co., Inc.) were prepared and tested for stability by observing for lumping, settling, or major phase separation. All samples showed good polysaccharide suspension, except sample 1. Based on these data, surfactant and lower alkanol can be used together or interchangeably without sacrificing the stability of the slurry.

TABLE 1

| | S-130 SLURRIES | | | | | | |
|---|---|---|---|---|---|---|---|
| | Sample No. | | | | | | |
| | 1 | 2 | 3 | 4 | 5 | 6 | 7 |
| MATERIALS | % BY WEIGHT | | | | | | |
| MINERAL OIL | 50 | 50 | 52 | 52 | 52 | 66 | 66 |
| NONYLPHENOL SURFACTANT | — | 1 | — | 2 | — | — | — |
| ORGANOPHILIC CLAY | — | 4 | 4 | 4 | 4 | 4 | 4 |
| ISOPROPYL ALCOHOL | — | 1 | — | — | 2 | 5 | — |
| S-130 | 50 | 44 | 44 | 42 | 42 | 25 | 25 |

What is claimed is:

1. A slurry useful in preparing spacer fluids, said slurry consisting essentially of:

| | % (wt.) |
|---|---|
| Heteropolysaccharide S-130 | 25–60 |
| Organophilic clay | 0.5–6 |
| Hydrocarbon solvent | 30–70 |
| Surfactant | 0–10 |
| Lower alkanol | 0–6 | wherein the surfactant is ethoxylated nonylphenol, the fatty acid esters of vegetable or animal oil, ethoxylated linear alcohol, or ethylene glycol monobutyl ether.

2. A slurry of claim 1, wherein the organophilic clay is bentonite, hectorite, amine-treated montmorillonite, or attapulgite clay; the solvent is mineral oil, diesel oil, kerosene, 5–12 carbon chain alcohol, or vegetable oil; and the lower alkanol is a 1–3 carbon branched- or straight-chain alcohol.

3. A slurry of claim 1, wherein the solvent is mineral oil, the surfactant is ethoxylated nonylphenol, and the lower alkanol is isopropanol.

4. A slurry of claim 1 consisting essentially of:

| | % (wt.) |
|---|---|
| S-130 | 23.5 |
| organophilic clay | 3.5 |
| mineral oil | 67.5 |
| surfactant | 3 |
| isopropanol | 2.5 |

5. A spacer fluid comprising water and a slurry of claim 1 said spacer fluid comprising 0.25 to 2.5 pounds S-130 per barrel (0.113–1.13 kg/158.98 l) of spacer fluid.

6. A process for preparing a spacer fluid which comprises adding and mixing therein a slurry of claim 1 to water such that the spacer fluid contains 0.25 to 2.5 lb/bbl (0.113–1.13 kg/158.98 l) of S-130.

* * * * *